United States Patent [19]

Ulich et al.

[11] Patent Number: 5,200,793
[45] Date of Patent: Apr. 6, 1993

[54] RANGE FINDING ARRAY CAMERA

[75] Inventors: Bobby L. Ulich; Kent Pflibsen, both of Tucson, Ariz.

[73] Assignee: Kaman Aerospace Corporation, Bloomfield, Conn.

[21] Appl. No.: 839,746

[22] Filed: Feb. 20, 1992

Related U.S. Application Data

[63] Continuation of Ser. No. 602,635, Oct. 24, 1990, abandoned.

[51] Int. Cl.[5] .......................... G01C 3/08; H04N 7/00
[52] U.S. Cl. ......................................... 356/5; 356/152; 358/96
[58] Field of Search ........................ 356/5, 152; 358/96

[56] References Cited

U.S. PATENT DOCUMENTS

| | | | |
|---|---|---|---|
| 3,644,042 | 2/1972 | Kolb, Jr. et al. | 356/5 |
| 3,649,123 | 3/1972 | Ulicki | 356/5 |
| 3,733,129 | 5/1973 | Bridges | 356/5 |
| 3,901,597 | 8/1975 | White | 356/5 |
| 4,167,329 | 9/1979 | Jelalian et al. | 356/5 |
| 4,721,385 | 1/1988 | Jelalian et al. | 356/5 |
| 4,928,152 | 5/1990 | Gerardin | 356/5 |
| 4,935,616 | 6/1990 | Scott | 356/5 |
| 4,950,075 | 8/1990 | Ichinose et al. | 356/5 |
| 5,006,813 | 4/1991 | Khoshnevisan et al. | 356/5 |

*Primary Examiner*—Stephen C. Buczinski
*Attorney, Agent, or Firm*—Fishman, Dionne & Cantor

[57] ABSTRACT

An electro-optical camera system is presented. In accordance with the present invention, a light source (e.g. laser) is modulated by an electro-optic modulator (such as a Pockels cell) and transmitted out through an optical system toward a static target scene. The light backscattered from the target scene is then focused by the same optics back through the same Pockels cell onto a two-dimensional array camera such as a CCD or a CID (charge-couple device or charge injection device). A computer determines the frequency modulation period of each pixel in the array as the frequency of the electro-optic modulator is varied. This period is inversely proportional to the range of the target in the direction defined by the pixel location. Thus, all three spatial coordinates (two angles and a range) of each target area sensed by each pixel are determined. The computer will display the array of range data using a suitable output device such as a video display unit or a printer.

26 Claims, 2 Drawing Sheets

RANGE FINDING ARRAY CAMERA

This is a continuation of copending application Ser. No. 07/602,635 filed on Oct. 24, 1990 now abandoned.

BACKGROUND OF THE INVENTION

This invention relates generally to an electro-optical imaging system. More particularly, this invention relates to a range finding array camera wherein three coordinates (two angles and a range) of elements within a selected scene sensed by each pixel are determined for display or other suitable output.

Presently known prior art devices for ranging using amplitude modulation suffer from operating environment related drifts in the instrumentation measurement characteristics and from an inability to range a complex scene in parallel. Still another disadvantage of prior art devices is the use of moving parts such as mechanical scanners which lead to a reduction in reliability and increased maintenance.

SUMMARY OF THE INVENTION

The above-discussed and other drawbacks and deficiencies of the prior art are overcome or alleviated by the electro-optical camera system of the present invention. In accordance with the present invention, a light source (e.g. laser) is modulated by an electro-optic modulator (such as a Pockels cell) and transmitted out through an optical system toward a static target scene. The light backscattered from the target scene is then focused by the same optics back through the same Pockels cell onto a two-dimensional array camera such as a CCD or a CID (charge-couple device or charge injection device). A computer determines the frequency modulation period of each pixel in the array as the frequency of the electro-optic modulator is varied. This period is inversely proportional to the range of the target in the direction defined by the pixel location. Thus, all three coordinates (two angles and a range) of each target area sensed by each pixel are determined. The computer will display the array of range data using a suitable output device such as a video display unit or a printer.

In accordance with the present invention, the same instrumentation is utilized for modulating both the light source and the light backscattered from the target. As a result, the influence of operating environment drifts in the instrumentation is greatly reduced. In addition, the use of a large aperture modulation device and appropriate optics makes it possible to obtain range information from spatially extended targets in parallel thereby increasing the measurement temporal bandwidth for extended targets using simple imaging detectors.

In addition, the lack of any moving parts provides an extremely reliable device suitable for operation in demanding environments and also reduces the maintenance requirements common to prior art devices which utilize moving parts such as mechanical scanners.

The resultant image using the camera of this invention will appear as three dimensional and so may find application in land surveying, radio telescope reflector metrology, automated topography mapping, bathymetric surveying, distortion sensing in large structures due to thermal effects, or gravitational effects or vibration, machine vision, robotics, unmanned vehicle guidance and autonomous vehicle guidance, navigation and control.

The above-discussed and other features and advantages of the present invention will be appreciated and understood by those skilled in the art from the following detailed description and drawings.

BRIEF DESCRIPTION OF THE DRAWINGS

Referring now to the drawings, wherein like elements are numbered alike in the several FIGURES.

DESCRIPTION OF THE PREFERRED EMBODIMENT

Figure 1:
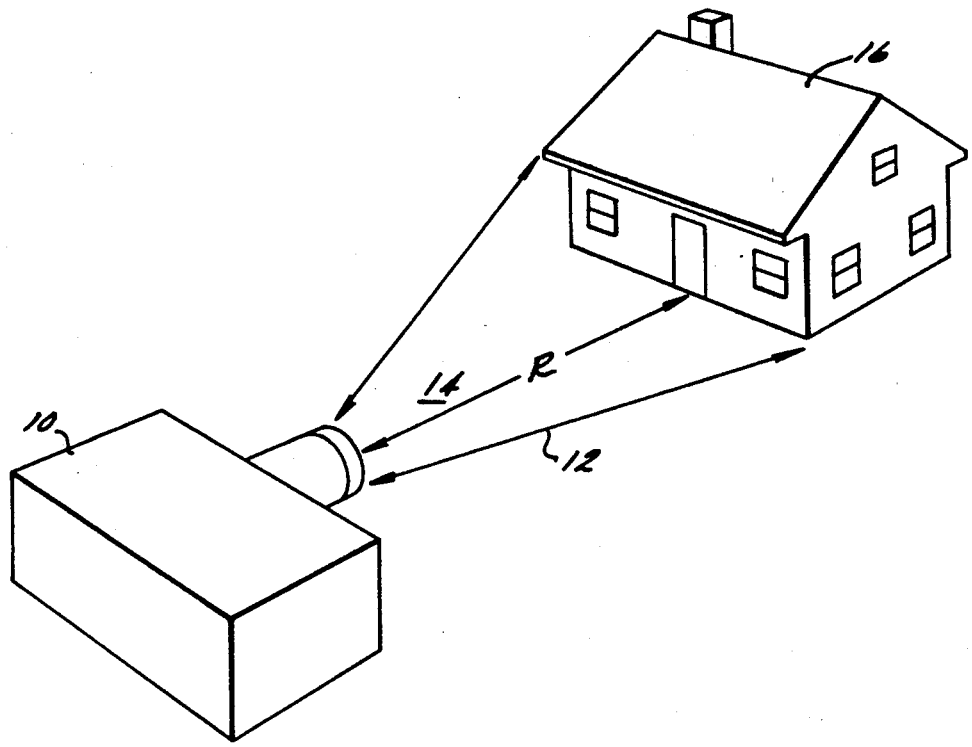
FIG. 1 is a perspective view of a range finding array camera in accordance with the present invention imaging a target scene.

Referring first to FIG. 1, a range finding array camera (also referred to as a 3-D camera) in accordance with the present invention is shown generally at 10. In general, camera 10 transmits a sinusoidal amplitude modulated light beam 12 through medium 14, which is at least partially transmissive to light (either visible light or infrared wavelengths could be used). Upon reflection from a target scene 16, some of the light returns over the same path through medium 14 in beam 12 to reach 3-D camera 10, which measures the three dimensional coordinates of features on target 16.

Figure 2:
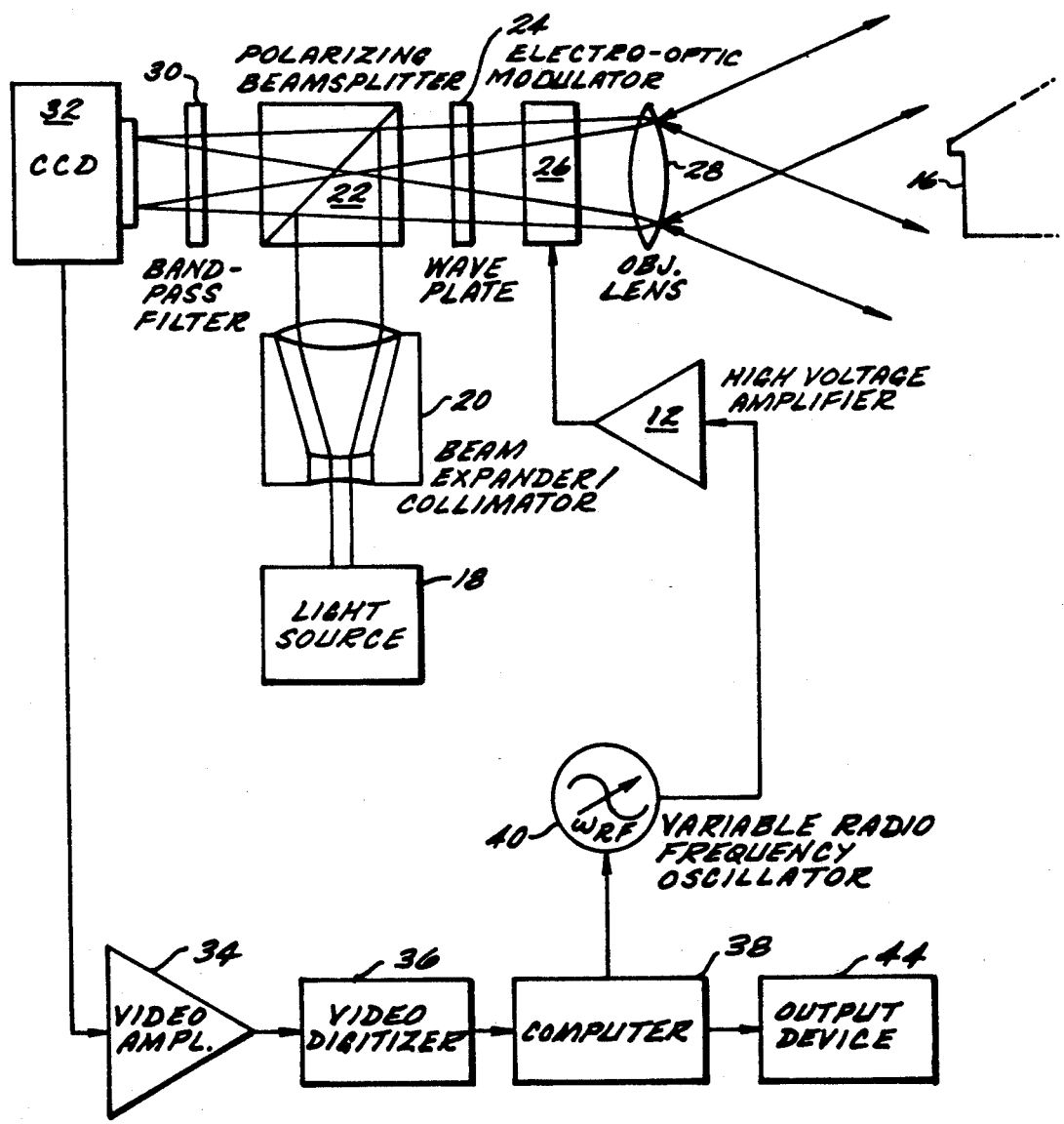
FIG. 2 is a schematic block diagram of the camera of FIG. 1.

The components of 3-D camera 10 are shown in FIG. 2. A continuous wave light source 18 with stable output power is used to illuminate the target 16. The light from source 18 passes through a beam expander/collimator 20 to modify the beam diameter so that the desired field of view is illuminated. Light source 18 may comprise a laser or any other type of C.W. source. Significantly, there are minimal bandwidth, spatial coherence, or spectral purity (temporal coherence) requirements for light source 18. The output from collimator 20 goes to a (polarizing) beam splitter 22, which reflects some of the light through polarization rotating wave plate 24 and to an electro-optic modulator 26. Preferably, electro-optic modulator 26 comprises a Pockels cell. Also, in a preferred embodiment, the wave plate 24 rotates the linear polarization of the light by 45° on each pass. This feature coupled with the polarizing beam splitter 22 allows high throughput efficiency and reduces the requirement on the light source power output. Electro-optic modulator 26 permits some of the light to pass through (depending on the voltage applied to the electro-optic crystal therein). In the particular embodiment being described, the optical transmissivity is modulated sinusoidally. However, any waveform shape (e.g., non-sinusoidal) can be used as long as it is periodic, stable and adaptive for use in a least squares fitting algorithm. After passing through an objective lens 28, the outgoing light illuminates the target scene 16, whereupon a portion (as indicated by the arrow heads) is reflected or scattered back to objective lens 28. Thus, the light travels twice through medium 14 over the distance R as shown in FIG. 1. (It will be appreciated that R is actually the optical path length from the center of the electro-optic modulator 26 to the target 16).

After being collected by lens 28, the return light beam again passes through electro-optic modulator 26, where again its amplitude is modulated sinusoidally (with a time delay equal to the round trip light propagation time to and from the target). The returned beam then passes through wave plate 24 and beam splitter 22 to reach a spectral bandpass filter 30 and a CCD (or analogous) camera 32. Filter 30 is used to eliminate or reduce extraneous ambient light from the target which would otherwise reach CCD 32. The sensed light input to CCD camera 32 is directed so that the image of target 16 formed by the objective lens 28 falls on the photo sensitive surface of camera 32. The CCD signals are then amplified by video amplifier 34 before being digitized by video digitizer unit 36. The quantized intensity levels corresponding to each camera pixel location are then transferred to computer 38.

The range data (which are a two-dimensional matrix of range values corresponding to each pixel) are determined by computer 38 by the following procedure: The computer 38 commands a specific frequency from a variable radio frequency oscillator 40. The oscillator output is amplified to a high voltage by high voltage amplifier 42 and then applied to Pockels cell 26. Next, a CCD exposure is made and intensities are stored in computer memory. Then, a series of exposures (pictures) are taken, each at an accurately controlled oscillator frequency $\omega_{RF}$ (radians/second). The pixel illuminance will depend upon the target range according to the following equation.

$$<I_w(i,j)> = I_O(i,j) + I_I(i,j) \cdot \cos(\omega_{RF} 2Rn/c) \quad (1)$$

where $I_w(i,j)$ is the instantaneous illuminance of the pixel at row i and column j in the CCD 32;
$<I_w(i,j)>$ is the time averaged value of $I_w(i,j)$;
$I_O(i,j)$ and $I_I(i,j)$ are constants;
$\omega_{RF}$ is the Pockels cell 26 modulation frequency;
n is the index of refraction of medium 14;
c is the speed of light in a vacuum; and
R is the range from the camera to the target.

Since $\omega_{RF}$ is a radio frequency and the CCD exposure time is usually about 1/30 second, a normal frame rate camera will average over many modulation cycles and will produce a very accurate estimate of $<I_w(i,j)>$.

If the electro-optic modulator modulates the outgoing beam by cos ($\omega_{RF} t$), then the return beam will be modulated by cos ($\omega_{RF}(t-\tau)$), where the round trip delay time $\tau$) is given by:

$$\tau = 2Rn/c \quad (2)$$

and t is time in seconds.

Figure 3:
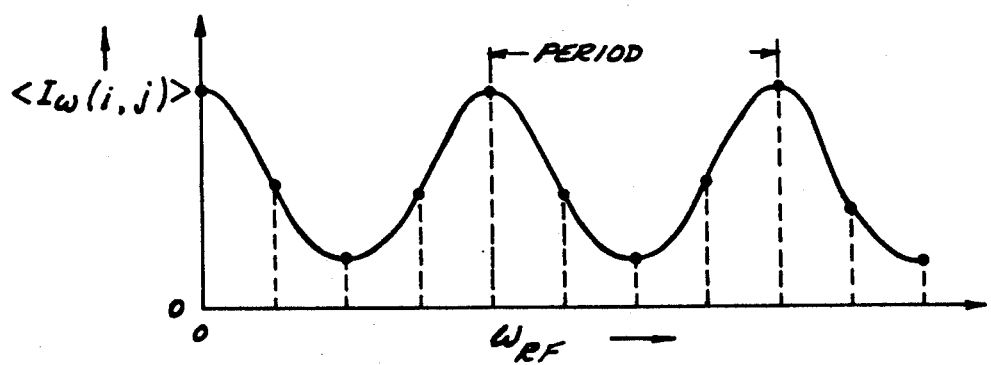
FIG. 3 is a graph depicting pixel intensity at one location in two dimensions vs. electro-optic modulation frequency.

If a plot is made of $<I_w(i,j)>$ versus $\omega_{RF}$ then a curve as shown in FIG. 3 is obtained.

By measuring the pixel illuminance at a number (at least 3) of well known values of the modulator frequency, a least-squares curve fitting algorithm may be applied to the data set for each Pixel to determine the three unknowns in Equation 1 [Io, $I_I$ and $\tau = 2Rn/c$]. Then the pixel range R (i,j) can be found (following Equation 2) as $$R(i,j) = (c/2n)\tau(i,j) \quad (3)$$

Finally, the computer 38 displays the array of range data using output device 44, which can be a video display unit, an alphanumeric printer, or any other computer output device.

The illuminance modulation depth $I_I(i,j)$ will depend on the electro-optic modulator, target reflectance, range and optical losses.

In air, n is approximately equal to 1. Thus, for R = 1 meter, the illuminance period P = $1/\tau$ = 150 MHz. Similarly, for R = 100 m, P = 1.5 MHz.

Any suitable least-squares curve fitting algorithm may be utilized in conjunction with this invention including the algorithm described in "Numerical Recipes—The Art of Scientific Computing" by W. H. Press, B. P. Flannery, S. A. Teakolsky, W. T. Vetterling pgs. 521–529.

For best accuracy it will be necessary to independently determine n. In air, n can be accurately determined from the wavelength of the light source and the temperature, humidity, and barometeric pressure.

The variable radio frequency oscillator 40 may be a digital synthesizer controlled by computer 38 or it may be a voltage controlled oscillator with a separate frequency counter providing the computer with an accurate $\omega_{RF}$ measurement for each image.

A high signal to noise ratio in the illuminance data is required for accurate range determination. Range accuracy is degraded by atmospheric turbulence in two ways:

(1) Optical path length varies, and
(2) scintillation of both outgoing and return beams produces apparent illuminance variations.

The useful range of the camera of this invention will ultimately be limited by the light source power camera sensitivity, the Pockels cell efficiency, and atmospheric turbulence.

While the present invention has been described in conjunction with a two dimensional array CCD camera, certain applications such as a land survey instrument (where the target could be a retroreflector) would require only a single photodetector element per retroreflector.

An important feature of this invention is that only a single Pockels cell (e.g., modulator) is required as opposed to prior art devices which necessitate at least two modulators.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. An electro-optical camera system comprising:
   light source means;
   light beam modulating means in communication with said light source means for modulating light received from said light source means;
   optical focusing means for directing said modulated light through a medium and at a target and for receiving light backscattered from said target and directing said backscattered light through said light beam modulating means wherein said light beam modulating means modulates said backscattered light;
   photodetector means having a plurality of pixels, said photodetector means for receiving said backscattered light from said light beam modulating means and detecting at least three intensity levels associated with a period of modulation back through said light beam modulating means for each of said pixels;
   frequency modulating means for varying the frequency of modulation of said light beam modulating means; and computer means for determining the frequency modulation period at each of said pixels as the frequency of modulation of said light beam modulating means is varied wherein range data of the target is determined.

2. The camera of claim 1 including:
output means for displaying said range data.

3. The camera of claim 1 wherein:
said range data defines a three dimensional image.

4. The camera of claim 1 wherein:
said light source comprises a laser.

5. The camera of claim 1 including:
beamsplitter means;
wave plate means in communication with said beamsplitter means; and
wherein said beamsplitter means and said wave plate means are optically positioned between said light source means and said light beam modulating means and wherein light from said light source means is transmitted through said beamsplitter means and said wave plate means and wherein said backscattered light is transmitted through said beamsplitter means and said wave plate means to said photodetector means.

6. The camera of claim 5 wherein:
said wave plate means rotates the polarization of the transmitted light by 45 degrees on each pass.

7. The camera of claim 5 wherein:
said beamsplitter means comprises a polarizing beam splitter.

8. The camera of claim 5 including:
a beam expander optically positioned between said light source means and said beamsplitter means.

9. The camera of claim 5 including:
bandpass filter means optically positioned between said photodetector means and said beamsplitter means.

10. The camera of claim 1 wherein:
said light beam modulating means modulates light sinusoidally.

11. The camera of claim 1 wherein:
said photodetector means comprises a two dimensional array camera.

12. The camera of claim 1 wherein:
said optical focusing means comprises an objective lens.

13. The camera of claim 11 including:
video amplifier means for amplifying video signals from said two dimensional camera, said video amplifier means communicating with said photodetector means; and
video digitizer means for digitizing said amplified video signals, said video digitizer means communicating between said video amplifier means and said computer means.

14. The camera of claim 1 wherein:
said frequency modulating means comprises a variable radio frequency oscillator.

15. The camera of claim 26 wherein:
said computer means fits the illuminance of each pixel using the equation:

$$<I_w(i,j)> = I_O(i,j) + I_I(i,j) \cdot \cos(\omega_{RF} 2Rn/c) \quad (1)$$

where
$I_w(i,j)$ is the instantaneous illuminance of the pixel at row i and column j in the said photodetector means;

$<I_w(i,j)>$ is the time averaged value of $I_w(i,j)$;
$I_O(i,j)$ and $I_I(i,j)$ are constants;
$\omega_{RF}$ is the light beam modulating means frequency;
n is the index of refraction of the medium;
c is the speed of light in a vacuum; and
R is the range from the camera to the target.

16. The camera of claim 15 wherein:
said light beam modulating means modulates light received from said light source means by $\cos(\omega_{RF}t)$ and modulates backscattered light by $\cos(\omega_{RF}(t-\tau))$ where:
$\tau = 2Rn/c$; and
t = time in seconds;

17. The camera of claim 16 wherein:
said computer means applies a least squares curve fitting algorithm to previously measured pixel illuminance data for at least three known values of modulator frequency to determine Io, $I_I$ and $\tau$.

18. The camera of claim 17 wherein:
each of said range values is determined by:

$$R(i,j) = (c/2n)\tau(i,j).$$

19. The camera of claim 1 wherein:
said light beam modulating means comprises electro-optic modulator.

20. The camera of claim 19 wherein:
said electro-optic modulator comprises a Pockels cell means.

21. The camera of claim 1 including:
light source beam splitter means optically positioned between said light source means and said light beam modulating means, said light source beam splitter means producing an array of beams for illuminating selected areas of a target scene.

22. A method for providing range data of a target using an electro-optical camera system including the steps of:
generating a light beam;
modulating the light beam using a light beam modulator;
directing the modulating light beam through a medium and at a target;
receiving light backscattered from the target and directing the backscattered light back through said light beam modulator wherein the received backscattered light is modulated;
detecting at least three intensity levels associated with a period of modulation back through said light beam modulator for each of a plurality of pixels; and
converting said period associated with said intensity levels at each of said pixels into range data of the target.

23. The method of claim 22 including the step of:
converting said range data to a three dimensional image of the target.

24. An apparatus for providing range data of a target using an electro-optical camera system including:
means for generating a light beam;
means for modulating the light beam using a light beam modulator;
means for directing the modulated light beam through a medium and at a target;
means for receiving light backscattered from the target and directing the backscattered light back through said light beam modulator wherein the received backscattered light is modulated;

means for detecting at least three intensity levels associated with a period of modulation back through said light beam modulator for each of a plurality of pixels; and means for converting said period associated with said intensity levels at each of said pixels into range data of the target.

25. The apparatus of claim 24 including:

means for converting said range data to a three dimensional image of the target.

26. The camera of claim 1 wherein:

said range data comprises a plurality of range values, each one of said range values corresponding to one of said pixels.

* * * * *